US007817550B2

(12) United States Patent
Sultan et al.

(10) Patent No.: US 7,817,550 B2
(45) Date of Patent: Oct. 19, 2010

(54) SYSTEM FOR RATE-CONTROL OF AGGREGATE-RATE COMMUNICATION SERVICES (75) Inventors: Robert Sultan, Somers, NY (US); Stein Gjessing, Oslo (NO); Xuan Zhang, Nanjing (CN); Zhusheng Deng, Shenzhen (CN); Xixiang Li, Shenzhen (CN); Jianfei He, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 704 days.

(21) Appl. No.: 11/622,646

(22) Filed: Jan. 12, 2007

(65) Prior Publication Data
US 2007/0165527 A1 Jul. 19, 2007

Related U.S. Application Data (60) Provisional application No. 60/758,870, filed on Jan. 13, 2006, provisional application No. 60/820,202, filed on Jul. 24, 2006.

(51) Int. Cl.
*G01R 31/08* (2006.01)
(52) U.S. Cl. ...................... 370/232; 370/235
(58) Field of Classification Search ................. 370/230, 370/230.1, 232, 233, 234, 235, 236, 395.21
See application file for complete search history.

(56) References Cited

U.S. PATENT DOCUMENTS 4,827,477 A * 5/1989 Avaneas ..................... 714/757

| 5,535,193 | A | 7/1996 | Zhang et al. |
| 5,748,901 | A | 5/1998 | Afek et al. |
| 5,857,147 | A | 1/1999 | Gardner et al. |
| 5,914,945 | A | 6/1999 | Abu-Amara et al. |
| 6,341,134 | B1 | 1/2002 | Toutain et al. |
| 6,515,969 | B1 | 2/2003 | Smith |
| 6,665,733 | B1 | 12/2003 | Witkowski et al. |

(Continued)

FOREIGN PATENT DOCUMENTS

CN    1426651 A    6/2003

(Continued)

OTHER PUBLICATIONS

Metro Ethernet Forum, Technical Specification, D00044_004, "Ethernet Services Attributes—Phase 2—Approved Draft 4," dated Aug. 27, 2006, 17 pages, The Metro Ethernet Forum 2005.
Metro Ethernet Forum, Technical Specification, D00044_006, "Ethernet Services Attributes—Phase 2—Approved Draft 6," dated Jul. 27, 2006, 69 pages, The Metro Ethernet Forum 2005.
IEEE Computer Society, IEEE Standard for Local and Metropolitan Area Networks, "Virtual Bridged Local Area Networks, Amendment 4: Provider Bridges," IEEE Std 802.1ad™, May 26, 2006, 74 pages.

(Continued)

*Primary Examiner*—Derrick W Ferris
*Assistant Examiner*—Peter Cheng
(74) *Attorney, Agent, or Firm*—Conley Rose, P.C.; Grant Rodolph (57) ABSTRACT A method of rate-control for a group of ports in a communication network. Ramping is performed for allowed-rate of each of the group of ports, if sum of the ingress-rates of the group of ports is less than a given rate threshold; and adjusting is performed for allowed-rate of each of the group of ports, if sum of the ingress-rates of the group of ports is greater than or equal to the given rate threshold, such that the sum of allowed-rates of the group of ports is equal to the given rate threshold.

60 Claims, 6 Drawing Sheets

U.S. PATENT DOCUMENTS

| | | | |
|---|---|---|---|
| 6,850,540 | B1 | 2/2005 | Peisa et al. |
| 7,102,997 | B2 | 9/2006 | Sultan et al. |
| 7,355,969 | B2 | 4/2008 | Champlin et al. |
| 7,372,814 | B1 | 5/2008 | Chiruvolu et al. |
| 7,515,535 | B2 | 4/2009 | Finn |
| 2002/0085559 | A1 | 7/2002 | Gibson et al. |
| 2003/0097461 | A1* | 5/2003 | Barham et al. .............. 709/235 |
| 2003/0133415 | A1 | 7/2003 | Kim et al. |
| 2003/0163593 | A1 | 8/2003 | Knightly |
| 2003/0165146 | A1 | 9/2003 | Sultan et al. |
| 2003/0172362 | A1 | 9/2003 | Mack-Crane et al. |
| 2003/0227926 | A1* | 12/2003 | Ramamurthy et al. .. 370/395.42 |
| 2005/0044272 | A1 | 2/2005 | Uzun et al. |
| 2005/0073952 | A1* | 4/2005 | Champlin et al. ........... 370/229 |
| 2005/0213558 | A1 | 9/2005 | Levit et al. |
| 2005/0262264 | A1 | 11/2005 | Ando et al. |
| 2006/0018313 | A1 | 1/2006 | Oki et al. |
| 2006/0098672 | A1 | 5/2006 | Schzukin et al. |
| 2006/0176900 | A1 | 8/2006 | Liu et al. |
| 2007/0143490 | A1* | 6/2007 | Gallou et al. ............... 709/231 |
| 2007/0165626 | A1 | 7/2007 | Sultan et al. |
| 2007/0165627 | A1 | 7/2007 | Sultan et al. |
| 2007/0263640 | A1 | 11/2007 | Finn |

FOREIGN PATENT DOCUMENTS

| | | |
|---|---|---|
| CN | 1534926 A | 10/2004 |
| CN | 1585504 A | 2/2005 |
| CN | 1614944 A | 5/2005 |
| CN | 1780347 A | 5/2006 |
| CN | 1897492 A | 1/2007 |
| EP | 1460808 A2 | 9/2004 |
| GB | 2342825 A | 4/2000 |
| WO | 2005013513 A1 | 2/2005 |

OTHER PUBLICATIONS

IEEE, "Information Technology- Telecommunications and Information Exchange Between Systems- Local and Metropolitan Area Networks- Specific Requirements, Part 3: Carrier Sense Multiple Access With Collision Detection (CSMA/CD) Access Method and Physical Layer Specifications," IEEE Std 802.3™, 2005, 100 pages (1-100).

IEEE, "Information Technology- Telecommunications and Information Exchange Between Systems- Local and Metropolitan Area Networks Specific Requirements, Part 3: Carrier Sense Multiple Access With Collision Detection (CSMA/CD) Access Method and Physical Layer Specifications," IEEE Std 802.3™, 2005, 100 pages (101-200).

IEEE, "Information Technology- Telecommunications and Information Exchange Between Systems- Local and Metropolitan Area Networks- Specific Requirements, Part 3: Carrier Sense Multiple Access With Collision Detection (CSMA/CD) Access Method and Physical Layer Specifications," IEEE Std 802.3™, 2005, 100 pages (201-303).

IEEE, "Information Technology- Telecommunications and Information Exchange Between Systems- Local and Metropolitan Area Networks- Specific Requirements, Part 3: Carrier Sense Multiple Access With Collision Detection (CSMA/CD) Access Method and Physical Layer Specifications," IEEE Std 802.3™, 2005, 87 pages (301-387).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (25 cover pages +1-75).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (76-175).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (176-275).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (276-373).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (374-473).

IEEE Computer Society, IEEE Standard for Information Technology- Telecommunications and Information Exchange Between Systems- Local and Metropolitan Area Networks- Specific Requirements, "Part 17: Resilient Packet Ring (RPR) Access Method and Physical Layer Specifications," IEEE Std 802.17™, Sep. 24, 2004, 100 pages (474-573).

IEEE Computer Society, IEEE Standard for Information Technology- Telecommunications and Information Exchange Between Systems- Local and Metropolitan Area Networks- Specific Requirements, "Part 17: Resilient packet Ring (RPR) Access Method and Physical Layer Specifications," IEEE Std 802.17™, Sep. 24, 2004, 91 pages (574-664).

Foreign Communication From a Related Counterpart Application—European Supplementary Search Report, EP 07785378.6, Nov. 3, 2008, 8 pages.

Foreign Communication From a Related Counterpart Application—International Search Report and Written Opinion, PCT/CN2007/070350, Sep. 27, 2007, 7 pages.

Duffield, Nick, et al., "A Performance Oriented Service Interface for Virtual Private Networks," Internet Engineering Task Force, Internet Draft, draft-duffield-vpn-qos-framework-00.txt, 28 pgs.

Office Action dated Jul. 20, 2009, U.S. Appl. No. 11/622,744, filed Jan. 12, 2007, 54 pages.

Foreign Communication From a Related Counterpart Application—Supplementary European Search Report, EP 07785404.0, Nov. 28, 2008, 12 pages.

Foreign Communication From a Related Counterpart Application—International Search Report and Written Opinion, PCT/CN2007/070348, Nov. 8, 2007, 12 pages.

Foreign Communication From a Related Counterpart Application—European Supplementary Search Report, EP 07764275.9, May 26, 2009, 7 pages.

Foreign Communication From a Related Counterpart Application—International Search Report and Written Opinion, PCT/CN2007/070351, Nov. 1, 2007, 8 pages.

Foreign Communication from a Counterpart Application—European application No. 07764275.9-13 European office action dated Nov. 12, 2009, 3 pages.

Office Action dated Feb. 23, 2010, U.S. Appl. No. 11/622,744, filed Jan. 12, 2007, 21 pages.

Office Action dated Jan. 21, 2010, U.S. Appl. No. 11/622,536, filed Jan. 12, 2007, 38 pages.

Foreign communication from a related counterpart application—European Office Action—EP 07764275.9, Nov. 12, 2009, 3 pages.

Newton, Harry. "Newton's Telecom Dictionary," Feb. 2006. CMP Books. 22nd Ed. P. 1009. p. 733.

Office Action dated Jul. 20, 2010, U.S. Appl. No. 11/622,744, filed Jan. 12, 2007, 16 pages.

Office Action dated Jul. 9, 2010, U.S. Appl. No. 11/622,536, filed Jan. 12, 2007, 46 pages.

* cited by examiner

SYSTEM FOR RATE-CONTROL OF AGGREGATE-RATE COMMUNICATION SERVICES

PRIORITY CLAIM

This application claims the priority of: U.S. Provisional Application No. 60/758,870, filed on Jan. 13, 2006, "METHOD OF RATE CONTROL FOR AN ETHERNET VIRTUAL SHARED MEDIUM" by Robert Sultan; and U.S. Provisional Application No. 60/820,202, filed on Jul. 24, 2006, "SYSTEM AND METHOD OF RATE-CONTROL FOR AN ETHERNET VIRTUAL SHARED MEDIUM" by Robert Sultan, Stein Gjessing, Xuan Zhang, Zhushen Deng, Linda Dunbar, Lucy Yong, Jianfei He, and Xixiang Li.

CROSS-REFERENCE TO RELATED APPLICATIONS

This application is related to: U.S. application Ser. No. 11/622,536, filed concurrently with the present application on Jan. 12, 2007, "SYSTEM FOR PROVIDING AGGREGATE-RATE COMMUNICATION SERVICES", by Robert Sultan, and Linda Dunbar; and U.S. application Ser. No. 11/622,744, filed concurrently with the present application on Jan. 12, 2007, "SYSTEM FOR RATE MANAGEMENT OF AGGREGATE-RATE COMMUNICATION SERVICES", by Robert Sultan, Linda Dunbar and Lucy Yong.

TECHNICAL FIELD OF THE INVENTION

The present invention relates generally to network communications, and more particularly, to a versatile system for rate-control of aggregate-rate communication services.

BACKGROUND OF THE INVENTION

Ethernet is one of the most widely-installed Local Area Network (LAN) technologies. Users are attracted by a number of advantages of Ethernet services, including ease of use, cost effectiveness, flexibility, and wide rage of service options, etc. Ethernet services have been extended to metropolitan areas and beyond.

Ethernet services may vary in many ways. The Metropolitan Ethernet Forum (MEF) defines two types of Ethernet services: E-Line services, which are point-to-point services; and E-LAN services, which are multipoint services such that each instance of service shares the use of a common underlying physical network. MEF specifies distinct layer-1 and layer-2 E-LAN services. A layer-1 E-LAN service is called an Ethernet LAN (ELAN) service, and a layer-2 E-LAN service is called an Ethernet Virtual LAN (EVLAN) service. The EVLAN allows users to exchange frames as if connected to a shared medium LAN.

Two methods currently used to specify rate guarantees for EVLAN services are port-to-port guarantee and per-port guarantee. Port-to-port guarantee specifies a distinct bandwidth guaranteed for traffic from a specific port to another specific port. This is a traditional guarantee provided in frame relay and private-line services. This method may be more efficient when port-to-port traffic rate is relatively constant.

Per-port guarantee specifies distinct bandwidth guaranteed for traffic originating from each port, without regard to destination ports. This type of guarantee is relatively easy to police as only knowledge of local port ingress traffic is required.

SUMMARY OF THE INVENTION

The present invention provides a method of rate-control for a group of ports in a communication network. Ramping is performed for allowed-rate of each of the group of ports, if sum of the ingress-rates of the group of ports, is less than a given rate threshold; and adjusting is performed for allowed-rate of each of the group of ports, if sum of the ingress-rates of the group of ports is greater than or equal to the given rate threshold, such that the sum of allowed-rates of the group of ports is equal to the given rate threshold.

In one embodiment, for a group of ports sharing a guaranteed-rate, each of the ports obtains ingress-rate information of all of the group of ports; increases its allowed-rate, if sum of the ingress-rates of all ports is less than the guaranteed-rate; and adjusts its allowed-rate, if sum of the ingress-rates of all ports is greater than or equal to the guaranteed-rate, such that sum of the ingress-rates of all ports is less than or equal to the guaranteed-rate. The present invention further provides other embodiments implementing the rate-control system summarized above.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

The following terms are used in the description of the present invention below:

Adjustment: A method of allowed-rate assignment used when the sum of measured ingress-rates is sufficiently high that continued ramping of rates could result in exhaustion of capacity associated with the aggregation-group.

Aggregation-group: The set of ports that share a guaranteed-rate.

Ingress: The direction from a user of a service to a provider of the service.

Port: The interface by which a user accesses the services of a service provider network. Examples are an 802.1ad Provider Edge Bridge (PEB) port or a Metropolitan Ethernet Forum (MEF) User-Network Interface (UNI).

Greedy port: A port whose ingress-rate is reduced when a) the current sum of ingress-rates is larger than permitted; and b) the strategy for reducing rates is to reduce the allowed-rate of port (or ports) with the highest current ingress-rate.

Non-greedy port: A port that is not greedy.

Local port: A term used in some descriptions to reference a particular port, of the set of ports in an aggregation-group. For example, a local port may be said that "a received rate-value is saved in an array R maintained by the local port".

Service Provider Network (SPN): A network offering connectivity services to customers, for example, an IEEE 802.1ad Provider Bridged Network (PBN) or an MEF Metropolitan Ethernet Network (MEN).

Ramping: A method of allowed-rate assignment in which the allowed-rate is assigned a value that is larger than the current value of a measured ingress-rate.

Rate-Message: A message distributed periodically from a port associated with an aggregation-group, to all other ports associated with that aggregation-group, carrying the value of the ingress-rate measured (and possibly smoothed or filtered) by that port.

Service Instance: An instance of the connectivity service offered by a Service Provider Network. Connectivity is permitted only between ports associated with the same service instance. Examples are an IEEE 802.1ad Service Virtual Local Area Network (SVLAN) or an MEF Ethernet Virtual Connection (EVC).

Notation used in the present invention is described in the following. For notational convenience, the symbol $\Sigma$ represents $$\sum_{i=0}^{n}$$

unless otherwise specified. $I_{(i,t)}$ indicates the value of I associated with port i at the end of time interval t.

Other identifiers are as follows:

$A_i$ (allowed-rate): The maximum rate at which traffic from a user is admitted to a service provider network at port i of an aggregation-group. $I_i$ always $\leq A_i$. $O_i > A_i$ implies $I_i = A_i$.

B: The minimum amount by which the value of $A_i$ for the next time interval should exceed the current value of $I_i$ when ramping of allowed-rates is performed.

C (committed capacity): Capacity committed by a service provider for use by an aggregation-group on a link within a Service Provider Network. A capacity commitment of C ensures that a specified service guarantee is met at all times. The service provider may commit less bandwidth than C, and assume a risk that the guarantee will not be met at all times.

$d_{ij}$ (delay): Time period, measured in seconds, beginning when a port i has measured its ingress rate $I_i$, for the most recent time interval, and ending when a port j references the corresponding value $R_i$ in computing S.

D (delay): The maximum value of $d_{ij}$ over all port pairs (i, j) in an aggregation-group.

F (sum of offered rates): Sum of the values of offered rate ($O_i$) over all ports i.

G (guaranteed-rate): A provisioned value such that $\Sigma I_i \geq G$ when ingress-rates have attained a steady-state. It is a guaranteed aggregate-rate for an aggregation-group.

$I_i$ (ingress-rate): Actual (measured) rate of traffic introduced by port i of an aggregation-group. The rate may be low-pass filtered or smoothed to achieve stability.

$M_{low}$ (low margin): A value intended to provide a margin or cushion to ensure that $S \geq G$ following rate restriction.

$M_{high}$ (high margin): A value intended to provide a margin or cushion to ensure that the service provider capacity commitment exceeds the computed capacity requirement.

$O_i$ (offered rate): A traffic rate presented by a user to a service provider at port i of an aggregation-group.

n (number of ports): Number of ports associated with an aggregation-group.

Q: Number of ports in an aggregation-group for which $R_i$ exceeds a computed maximum allowed-rate X.

$R_i$: Value of $I_i$ most recently received by a local port in a rate-message from port i. $R_{local}$ is assigned the current value of $I_{local}$.

S: Sum of $R_i$ over all ports i in an aggregation-group.

$S_{max}$: The maximum value attained by S.

t: A count of the number of elapsed time intervals of duration T.

T: A fixed time interval between broadcasts of a value of $I_i$ by port i of an aggregation-group. Re-computation of the allowed-rate is also performed on this time boundary.

X: The largest value of $A_i$ that may be assigned to any port i in an aggregation-group following a rate adjustment.

Figure 1:
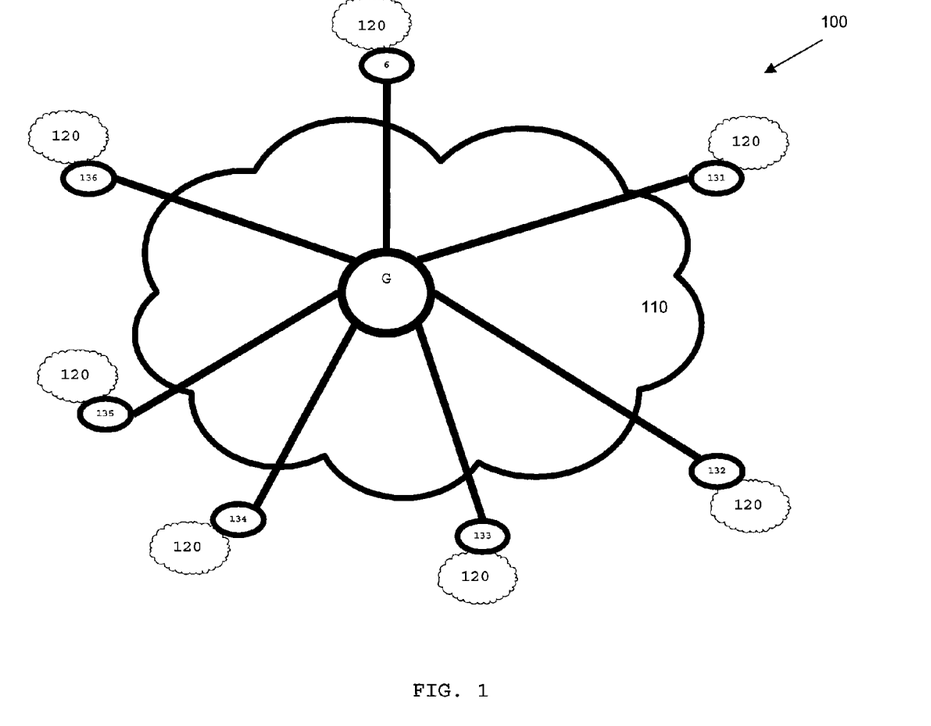
FIG. 1 illustrates an aggregate-rate service model according to the present invention.

Referring now to FIG. 1, an example of an aggregate-rate service model (100) is illustrated. A service provider network (110) offers aggregate-rate communication services to a customer (120). Customer (120) is associated with 7 ports, port (131) (136) and (6), to access Service Provider Network (110). The 7 ports share one guaranteed-rate G, forming an aggregation-group. Rate-control algorithms may be used to control ingress rate of each port within the aggregation-group, to ensure that an aggregate-rate service provided by Service Provider Network (110) complies with a Service Level Agreement (SLA). Service provider network (110) may have an arbitrary topology. Ports in an aggregation-group share capacity of the aggregation-group fairly.

An aggregate-rate service may be characterized by a guaranteed-rate, G, an amount of rate increase, B, permitted during each time interval, t, and duration of the time interval, T. An SLA may specify that the aggregate-rate service model guarantees that:

1) total ingress rate, $\Sigma I_i$, is greater than or equal to G; or
2) any port having an offered rate, $O_i$, greater than or equal to the current ingress-rate, $I_i$, may increase its ingress-rate by at least B during the next time interval, t.

In one embodiment, each port measures $I_i$ during the current time interval t. At the completion of the time interval t, a port i, such as port (131), distributes a rate-message, containing the measured (and possibly smoothed and/or filtered) ingress-rate value $I_i$, together with the identity of the port, i. The rate-message may be distributed by means of broadcast, multicast or unicast.

A port associated with an aggregation-group comprising n ports receives rate-messages originated by each of the other ports within the aggregation-group. The time delay between the sending of a rate-message by a port i and the receipt of that message at another port j is at most D seconds. A port j, such as port (137), maintains an array R of n elements containing the most recently received rate values received from the other n−1 ports. A port, e.g., port j (137), does not send rate-messages to itself. Instead, element j of array R at port j (137) contains the most recent ingress-rate measured at port j. When referencing a particular port like port j (137) here, the port may be called a local port. A local port may determine for itself an allowed-rate for next time interval using ingress-rate measured at the local port and rate information received from other ports of an aggregation-group. Allowed-rate and ingress-rate of a local port may be represented by $A_{local}$ and $I_{local}$, respectively.

By receiving rate-messages distributed by all other ports in the aggregation-group, each port may obtain ingress-rate information of all other ports, and use rate-control methods to control its allowed-rate for the next time interval. The sum of most recently received ingress-rates is computed at the end of each time interval, t, and on each port, i, of the aggregation-group, as:

$$S = \Sigma R_i.$$

Following the computation of S at the end of a interval t, $A_{local}$ is computed. Therefore, each port within an aggregation-group receives ingress-rate information from all the other ports within the aggregation-group via rate-messages, and then calculates an allowed-rate. One of two methods of computation may be used, depending on the relative values of S and G.

If (S<G), then ramping is performed; otherwise, if (S≧G), adjustment is performed.

In one embodiment, the value of $A_{local}$ for the next time interval, t, may be computed in two stages in the case of ramping. The first stage is:

$$A_{local} = I_{local} + B.$$

That is, a port, i, sending at rate $I_i$ during time interval t, may be restricted by $A_i = I_i + B$ during time interval t+1. B may be defined in a Service Level Agreement. In the absence of delay, this method of ramping ensures that ($\Sigma I_i < G + nB$) for time interval t+1, since $\Sigma I_i < G$ in time interval t, and each of n ports may increase their ingress rates by no more than B.

The second stage is:

```
If (S+nB < G) {
    A_local = A_local + (G−(S+nB))/(nD);
}
```

(S+nB) is the largest value that S may attain in the next time-interval. If this value is less than G, then $A_{local}$ may be further increased by (G−(S+nB))/(nD), without danger of traffic exceeding C during the next delay D.

An alternative embodiment of ramping in the present invention omits the second stage of ramping. In this case, the allowed-rate at each port is ramped by a fixed amount B per time interval t, without regard to additional capacity that may be available. This technique is called "linear" ramping to distinguish it from "accelerated" ramping, which includes both the first and the second stage ramping. Linear ramping converges more slowly to maximum rates than accelerated ramping. Service validation is, however, simplified, as the expected rate increase during periods of ramping is constant.

In the case of adjustment, one embodiment is to compute a maximum value of allowed-rate X such that $$G = \Sigma R_i (\text{for } R_i < X) + \Sigma X (\text{for } R_i \geq X).$$

The expression "$\Sigma X$ (for $R_i \geq X$)" above has the same meaning as "Q*X", where Q is the number of ports in an aggregation-group having the property that $I_i \geq X$.

If the value of X has been determined, then $$A_{local} = \text{MIN}(I_{local}, X) + B.$$

one embodiment of a method for computing X sorts elements $R_1$ through $R_n$ of an array R in descending order ($R_1$ is largest), where the array R consists of $R_i$ of all n ports within an aggregation-group. Then array R is stepped through from the largest to smallest element. At each step, all elements having rate values larger than a current element (that is, elements having a smaller index value in the array) are replaced with the value of the current element. The stepping is discontinued when the sum of all elements in array R is less than or equal to the aggregate-rate G. When this occurs, elements with indices lower than the current index represent "greedy" ports whose allowed-rates are reduced.

The above embodiment of algorithm may be implemented using a pseudo code with following forms:

Sort $R_1$ through $R_n$ of an array R in descending order;

```
i = 1;
while (i*R_i + ΣR_j (for j = (i+1) to n) > G) {
    i++;
}
```

The rates in array elements 1 to (i−1) represent the "greedy" ports. The greedy ports share equally in the bandwidth remaining when rates in array elements i to n are subtracted from the aggregate-rate G, and X is computed as:

$$X = (G - \Sigma R_j (\text{for } j=i \text{ to } n))/(i-1).$$

A second embodiment of a method for computing X sorts elements $R_1$ through $R_n$ of an array R in descending order ($R_1$ is largest); and sums up all values of R. The two operations (sort and sum) above may be performed incrementally when rate-messages are received. Then the array R is stepped through from the largest valued element (i=1) to smallest valued element (i=n). At each step, all elements with indices less than i are logically replaced by the value of the current element ($R_i$) (it is not necessary to physically update these array elements). The sum of elements 1 through (i−1) is computed as (i−1)*$R_i$. The sum of elements i through n is maintained as sumAtOrAboveI at each step by decrementing the current sumAtOrAboveI by $R_i$. Stepping is discontinued when the value of ((i−1)*$R_i$+sumAtOrAboveI) is less than or equal to the guaranteed-rate G. When this occurs, elements with indices lower than the current index represent "greedy" ports whose allowed-rates are reduced.

The embodiment of algorithm may be implemented using a pseudo code with following forms:

Sort $R_1$ through $R_n$ of an array R in descending order;

```
sum = sum of values in array R;
i = 1;
//sumAtOrAboveI represents the sum of the values of
//the array elements whose index is larger than or
//equal to the current index i.
sumAtOrAboveI = sum;
while (((i−1)*R_i + sumAtOrAboveI) > G) {
    i++;
    sumAtOrAboveI = sumAtOrAboveI − R_i;
}
```

The rates in array elements 1 to (i−1) represent the "greedy" ports. The greedy ports share equally in the bandwidth remaining when the rates in array elements i to n are subtracted from the guaranteed-rate G, and X is computed as:

$$X=(G-\text{sumAtOrAbove}I)/(i-1).$$

A third embodiment of a method for computing X divides the space of possible values of X into equal partitions, and determines whether a desired value of X lies in the upper portion or the lower portion. The procedure continues recursively on a selected portion until the sum of rates obtained using the current value of X is approximately equal to G. The algorithm operates in a manner similar to a binary search.

A pseudo code to implement the algorithm may be as follows:

```
interval = G/2;
X = G/2;
temp = ΣR_i (for R_i < X) + ΣX (for R_i ≥ X);
while (temp !≈ G) {
    interval = interval/2;
    if (temp > G) {
        X = X − interval;
    } else {
        X = X + interval;
    }
    temp = ΣR_i (for R_i < X) + ΣX (for R_i ≥ X);
}
//Determine the index of the first array element
//representing a port that is not greedy.
while (R_j > X) {
    j++;
}
//Determine the number of greedy ports:
Q = j−1;
```

Greedy ports share bandwidth remaining after rates of non-greedy ports are subtracted from the aggregate-rate, and X is computed as:

$$X=(G-\Sigma R_i(\text{for } R_i<X))/Q.$$

A fourth embodiment of a method for computing X is illustrated by the following pseudo code. This embodiment does not require a sort of array values.

```
//Q is the number of "greedy" ports
Q = 1;
temp = ΣR_i;
//The current sum of rates of non-greedy ports
temp = temp − max(R_i);
    j = index(max(R_i));
//substitute 0 for maximum value in the array
R_j = 0;
//X was second largest rate value in array, now it is
//the largest
X = max(R_i);
//Exit loop when greedy ports give higher rate than
//non-greedy port:
loop until ((G − temp)/Q > X)
{
    //the largest remaining value in array
    j = index(max(R_i));
    //substitute 0 for the largest remaining value
    R_j = 0;
    //The current sum of rates of non-greedy ports
    temp = temp − X;
    the number of "greedy" ports
    Q++;
    //X was second largest rate value in array, now it
    //is the largest
    X = max(R_i);
}
//The rate assigned to greedy ports
X = (G − temp)/Q;
```

The rate-control algorithms above include the criterion for evaluating the value of X:

$$G=\Sigma R_i(\text{for } R_i<X)+\Sigma X(\text{for } R_i\geq X);$$

or $$G\approx\Sigma R_i(\text{for } R_i<X)+\Sigma X(\text{for } R_i\geq X);$$

The rate-control algorithm includes the specific algorithms described above and variations of these algorithms embodying the essential concepts of the algorithms.

Figure 2:
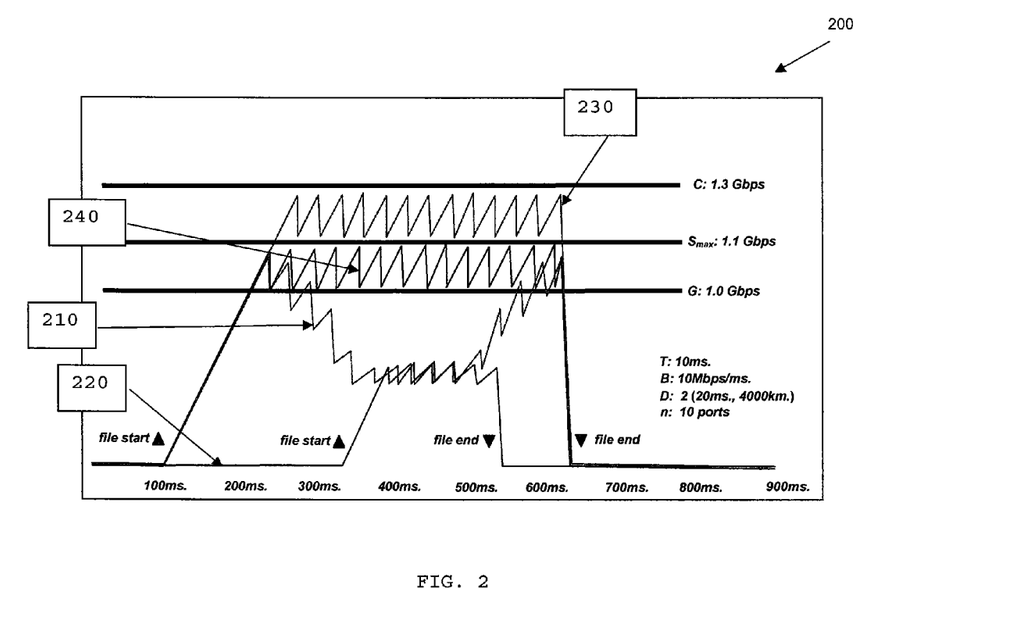
FIG. 2 illustrates the behavior of a rate-control algorithm according to the present invention.

The behavior 200 of the rate-control algorithm is illustrated in FIG. 2 for a case of a customer having an aggregation-group of ten ports, with a maximum path distance between ports of 1000 km, and a guaranteed-rate of 1 Gbps. Rate broadcast and allowed-rate computation are performed every 10 ms. The ingress rate at each port is allowed to increase 10 Mbps in every 10 ms interval. The total capacity required to meet the rate-guarantee is 1.3 Gbps. This may be compared to the commitment of at least 5 Gbps required if the 1 Gbps rate is guaranteed at each port concurrently. In FIG. 2, curve (210) shows the ingress traffic of a first file transferred from a first port, curve (220) shows the ingress traffic of a second file transferred from a second port. The actual sum of the ingress traffic is shown by curve (230). Curve (240) is the sum of ingress traffic as learned from delayed rate-messages.

Figure 3:
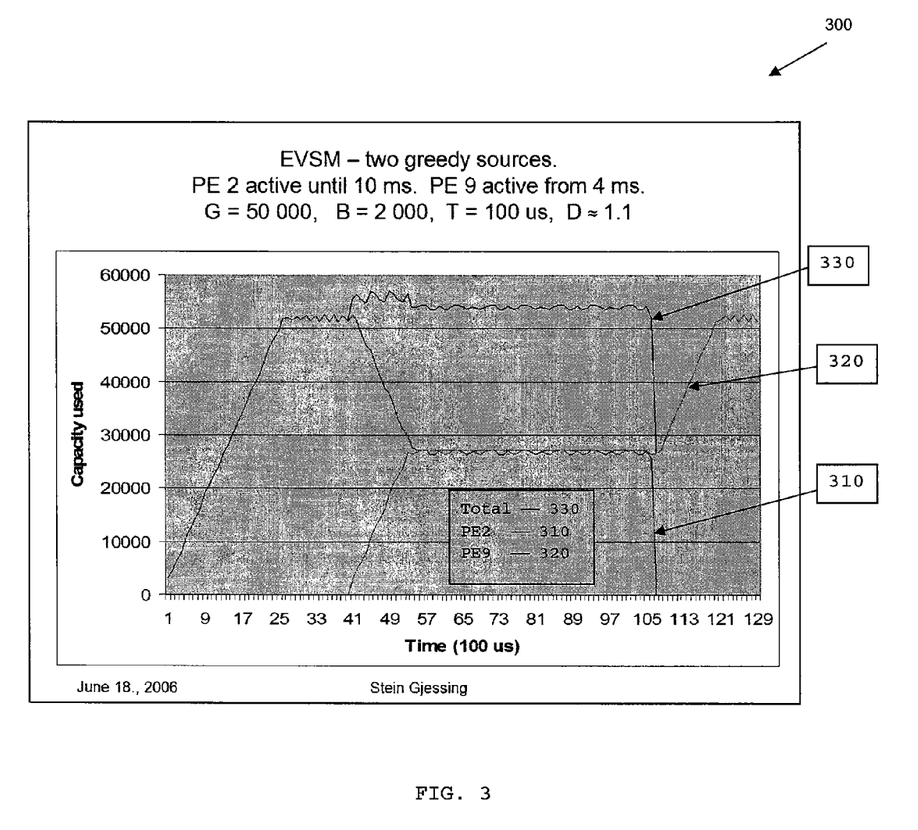
FIG. 3 illustrates the operation of a rate-control algorithm according to the present invention.

Simulation results 300 shown in FIG. 3 illustrate the operation of a rate-control algorithm in a simple case, in which an aggregation-group contains ten member ports. In this example, port 2, i.e., curve (310) begins sending a file, after some time Port 9, i.e., curve (320) starts sending a file, and after some further time, port 2 finishes sending the file. Curve (330) shows the sum of ingress traffic of port 2 and 9. The maximum value of curve (330) indicates capacity C required to support the guaranteed-rate G. When only a single port is sending, curve (330) coincides with the rate of the single sending port. When two ports send at once, the sum of ingress traffic-curve (330) exceeds the guaranteed-rate due to the delay experienced by a port in receiving rate information from other ports.

Figure 4:
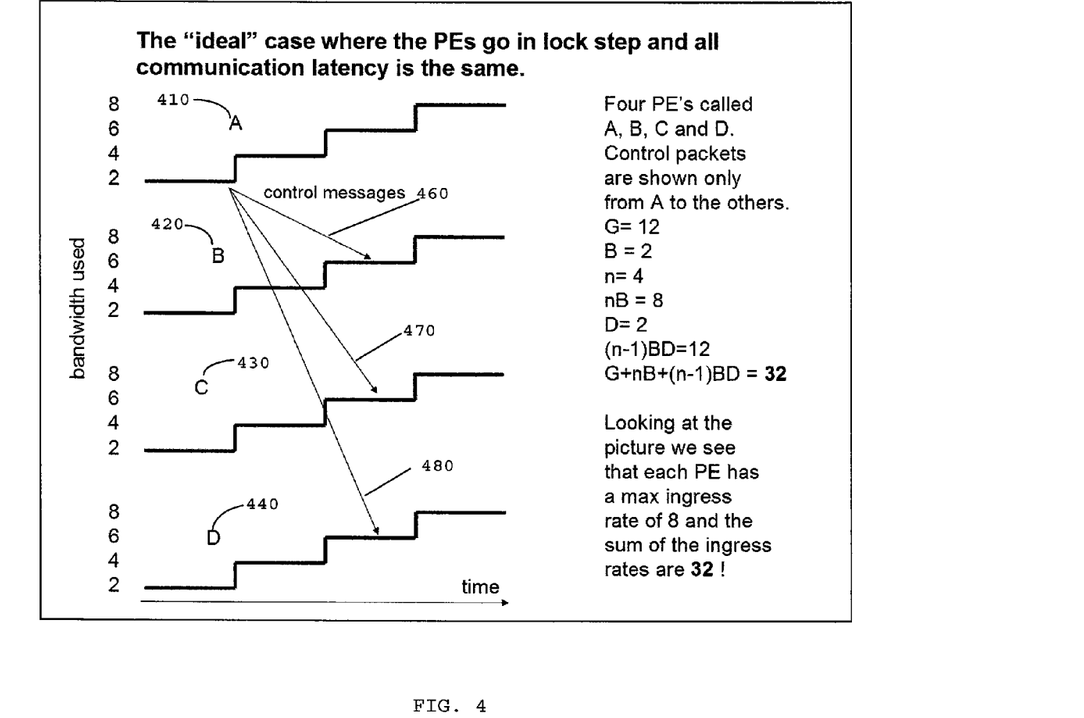
FIG. 4 illustrates the bandwidth used in an "ideal" case where offered rates of ports change in an identical manner (in lock-step), and all communication latency is the same according to the present invention.
Figure 5:
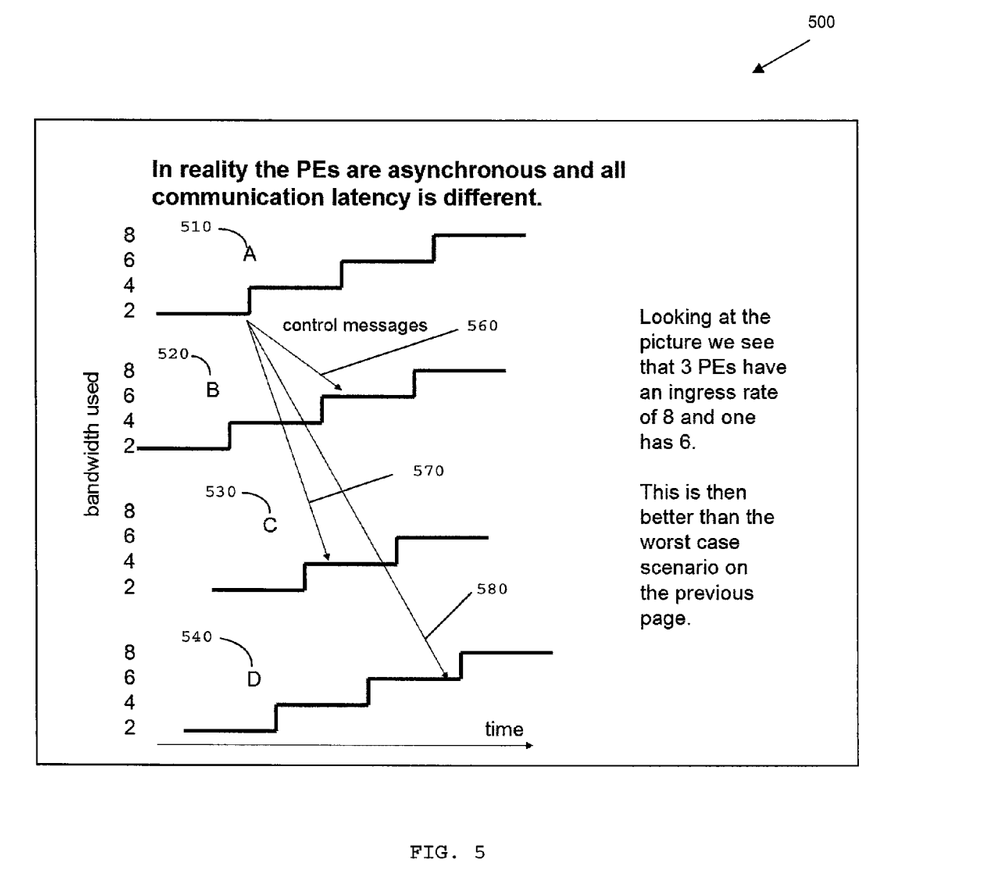
FIG. 5 illustrates the bandwidth used in real situations where offered rates of ports are asynchronous and all communication latency between two ports is independent of latency between other ports according to the present invention.

FIGS. 4 and 5 illustrate that the assumption that ports operate in "lockstep" (that is, their activities are synchronized with respect to each other) provides a conservative, or worst-case, result for the value of D. Relaxing this assumption, and viewing port activity as asynchronous, may only reduce the value of D. FIG. 4 shows an "ideal" case 400 where changes in allowed-rate occur at the same instant at each port, and all communication latency between ports is the same. There are four ports called A (410), B (420), C (430) and D (440). Rate-messages are shown only from A (410) to others ports, which include rate-messages (460), (470) and (480). Parameters are as follows: G=12, B=2, n=4, nB=8, D=2, (n−1)BD=12, and G+nB+(n−1)BD=32. FIG. 4 shows that each port has a maximum ingress-rate of 8 and an ingress-rate sum of 32.

But in reality 500, as shown in FIG. 5, the ports are asynchronous and all communication latency differs among port pairs. In FIG. 5, there are still four ports called A (510), B (520), C (530) and D (540). Rate-messages are shown only from A to others ports, including rate-messages (560), (570), and (580). FIG. 5 shows that three ports have an ingress-rate of 8 and one has an ingress rate of 6. In this case, the required capacity C is reduced. This is better (i.e., less capacity is required) than the worst case scenario illustrated in FIG. 4.

The rate-control algorithms and the SLA may be used to determine worst-case capacity needed to support guaranteed-rates in a system providing aggregate-rate services.

In the absence of delay, use of one of the rate-control algorithms above ensures that allowed-rate values for the next time interval are assigned at each port such that $\Sigma A_i \leq S+nB$, where S is the value of $\Sigma R_i$ associated with a current time interval. The value of S may not be permitted to increase beyond the value of G. Hence, in the absence of a delay (i.e., D=0), the capacity required on a link within a network that is on the data path of all communications between group members (i.e., a cut-point in a network graph), is no more than G+nB.

In the presence of a delay (D>0), rate-messages of n−1 ports are delayed. A rate-message at a local port (site of the rate computation) is not delayed as no physical message is sent. For each remote port, an ingress-rate may rise by B in each time interval T. There are D/T time intervals of duration T during a delay of time D. D may be computed as half the round-trip delay between two ports. During the delay D, the rate at a remote port may rise BD/T. Hence, the value of S (based on received rates) underestimates the value of $\Sigma I_i$ by (n−1)BD/T. It follows that the capacity required on the link is G+nB+(n−1)BD/T.

It is important to note that the capacity is computed for a worst-case in which all traffic passes over a subject link. If traffic is transported on diverse paths, the capacity requirement computed above may be reduced, depending on knowledge of the distribution of traffic across the diverse paths.

There may be a concern that transient network conditions (e.g., a change in the physical location of a port that has not been reflected in the value of D) may result in a failure to provide the contracted aggregate-rate.

Figure 6:
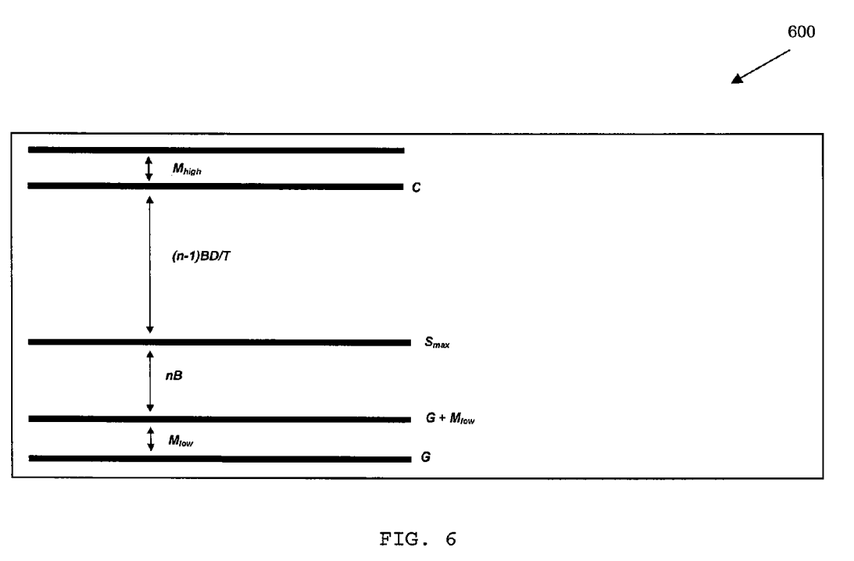
FIG. 6 illustrates the capacities of a service provider providing capacity margins according to the present invention.

Referring now to FIG. 6, C indicates the total capacity requirement in the presence of delay D, and (n−1)BD/T indicates the capacity specifically required by the presence of the delay. $S_{max}$ indicates the capacity requirement when delay is zero, and nB is the increase in ingress-rate allowed during the current time interval. G indicates a guaranteed-rate. In order to reduce the likelihood that transient changes in a service provider network may cause capacity to be exceeded due to fluctuations in required capacity, a service provider may commit additional capacity $M_{low}$ and/or $M_{high}$ to provide a region of buffer between the nominal guaranteed-rate specified in the customer contract and the guarantee that is actually enforced by the service provider. If $M_{low}$>0, a rate-control algorithm may be modified so that all instances of G are changed to (G+$M_{low}$). The capacity requirement may be changed to (G+$M_{low}$)+nB+(n−1)BD/T+$M_{high}$.

The rate-control methods in the present invention may be applied in a manner entirely independent of an aggregate-rate service model or any specific guaranteed-rate. A port may learn by some unspecified means (for example, a congestion-notification), that it is desirable to reduce (or to increase) the aggregate amount of network ingress traffic. The value of G in the rate-control algorithms may be set to a value lower (or higher) than the current sum of ingress rates or a previously used value of G. The effect is to fairly reduce (or increase) ingress-rates so that, for example, ports sending at low rates would not experience rate reduction in response to congestion as such ports are unlikely to be responsible for that congestion.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of rate-control for a group of n ports in a communication network, comprising the steps of:
    obtaining ingress-rate information of each of the group of n ports;
    distributing a communication message containing ingress-rate information of the distributing port;
    ramping, by a processor, an allowed-rate for each of the n ports, if the sum of the ingress-rates of the n ports, s, is less than a given rate threshold, G; and
    adjusting, by the processor, the allowed-rate for each of the n ports, if the sum of the ingress-rates of the n ports, s, is greater than or equal to the given rate threshold, G, such that the sum of allowed-rates of the n ports is equal to the given rate threshold G,
    wherein the group of n ports forms an aggregation-group, and the given rate threshold is a guaranteed-rate shared by the group of n ports, and
    wherein the step of adjusting further comprising the steps of, for a local port in the aggregation-group:
        determining a maximum allowed-rate X, such that X satisfies G=$\Sigma$Ri (for Ri<X)+$\Sigma$X (for Ri$\geq$X), or G$\approx\Sigma$Ri (for Ri<X)+$\Sigma$X (for Ri$\geq$X), wherein Ri is the ingress-rate of port i (i=1, . . . n) in the aggregation-group, obtained in a rate-message distributed by port i; and
        assigning the allowed-rate of the local port a value of (MIN(Ilocal,X)+B), wherein B is an amount of rate increase per time interval t of duration T, and Ilocal is the ingress-rate of the local port for the current time interval.

2. The method of rate-control in claim 1, wherein the n ports in the aggregation-group share the guarantee-rate fairly.

3. The method of rate-control in claim 1, wherein the communication network has an arbitrary topology.

4. The method of rate-control in claim 1, further comprising each port in the aggregation-group distributing a rate-message to other ports of the aggregation-group containing ingress-rate information of the distributing port.

5. The method of rate-control in claim 4, wherein the rate-message comprises an ingress-rate value and identity of the distributing port.

6. The method of rate-control in claim 4, wherein the rate-message is distributed by broadcasting.

7. The method of rate-control in claim 4, wherein the rate-message is distributed by multicasting.

8. The method of rate-control in claim 4, wherein the rate-message is distributed by unicasting.

9. The method of rate-control in claim 4, wherein the rate-message is distributed at a given time interval.

10. The method of rate-control in claim 1, wherein the step of ramping or adjusting is performed by each port of the aggregation-group.

11. The method of rate-control in claim 1, wherein the step of ramping or adjusting is performed at a given time interval.

12. The method of rate-control in claim 1, wherein the step of ramping comprises, for a local port in the aggregation-group, setting the allowed-rate of the local port for the next time interval to equal to the sum of the ingress-rate of the local port measured during the current time interval, and an amount, B, wherein B is an amount of rate increase per time interval t of duration T.

13. The method of rate-control in claim 12, wherein B is defined in a Service Level Agreement (SLA).

14. The method of rate-control in claim 12, further comprising a step of increasing the allowed-rate of the local port by an amount of (G−(S+nB)/nD) if (s+nB<G), wherein D is the maximum value of delays between any two ports of the aggregation-group.

15. The method of rate-control in claim 14, wherein the delay between any two ports of the aggregation-group is computed as half the round-trip delay between the two ports.

16. The method of rate-control in claim 1, wherein B is defined in a Service Level Agreement.

17. The method of rate-control in claim 1, wherein the step of determining X further comprises:
   determining greedy ports; and
   computing X such that X is the allowed-rate assigned to each greedy port, allowed-rates of non-greedy ports are unchanged, and the sum of allowed-rates of all ports in the aggregation-group is equal to G.

18. The method of rate-control in claim 17, wherein the greedy ports are determined by an algorithm comprising the steps of:
   forming an array R using distributed ingress-rates $R_i$ (i=1, ... n) of port i in the aggregation-group;
   sorting array R in a descending order;
   stepping through array R from the largest element to the smallest element;
   replacing all elements having ingress-rate values larger than the current element with the ingress-rate value of the current element;
   repeating the previous two steps until sum of all elements in array R is less than or equal to the guaranteed-rate G; and
   determining that the greedy ports are those having an index less than the index of the current element in array R.

19. The method of rate-control in claim 18, wherein the algorithm is implemented by a pseudo code with following forms:
   1) sort R1 through Rn of array R in a descending order;
   2) i=1;
   3) while (i*Ri+ΣRj (for j=(i+1) to n)>G) {i++;}.

20. The method of rate-control in claim 19, wherein X is computed as (G−ΣRj (for j=i to n))/(i−1).

21. The method of rate-control in claim 17, wherein the greedy ports are determined by an algorithm comprising the steps of:
   forming an array R using distributed ingress-rates $R_i$ (i=1, ... n) of port i in the aggregation-group;
   sorting array R in a descending order;
   stepping through array R from the largest element to the smallest element;
   summing up all elements in array R that has an index larger than the index of the current element, resulting in sumAtOrAboveI;
   repeating the previous two steps until (sumAtOrAboveI+ k*current element) is less than or equal to the guaranteed-rate G, wherein k is the number of elements that has an index less than or equal to the index of the current element; and
   determining that the greedy ports are those ports having an index less than or equal to the index of the current element.

22. The method of rate-control in claim 21, wherein the algorithm is implemented by a pseudo code with following forms:

```
1) sort R1 through Rn of array R in a descending order;
2) sum = sum of values in array R;
3) i = 1;
4) sumAtOrAboveI = sum;
5) while (((i−1)*Ri +sumAtOrAboveI)>G) {
6)    i++;
7)    sumAtOrAboveI = sumAtOrAboveI − Ri; }.
```

23. The method of rate-control in claim 22, wherein X is computed as (G−sumAtOrAboveI)/(i−1).

24. The method of rate-control in claim 17, wherein the greedy ports are determined by an algorithm comprising the steps of:
   dividing space of possible values of X into two equal partitions;
   determining which partition a desired value for X lies in;
   repeating the previous two steps until ΣRi (for Ri<X)+ΣX (for Ri≧X) is approximately equal to the guaranteed-rate G; and
   determining that the greedy ports are those that having an ingress-rate larger than or equal to X.

25. The method of rate-control in claim 24, wherein the algorithm is implemented by a pseudo code with following forms:

```
1)   interval = G/2;
2)   X = G/2;
3)   temp = Σ Ri (for Ri < X) + ΣX (for Ri ≧ X);
4)   while (temp !≈ G) {
5)      interval = interval/2;
6)      if (temp > G) {
7)         X = X − interval;} else {
8)         X = X + interval;}
9)      temp = ΣRi (for Ri < X) + ΣX (for Ri ≧ X); }
10)  while (Rj > X) { j++;}
11)  Q = j−1.
```

26. The method of rate-control in claim 25, wherein X is computed as X=(G−ΣRi (for Ri<X))/Q, and Q is the number of greedy ports.

27. The method of rate-control in claim 17, wherein the greedy ports are determined by an algorithm comprising the steps of:
   determining the maximum value of the ingress-rates for ports in the aggregation-group;
   assigning the maximum value to X;
   replacing the ingress-rate of the port that has maximum value with 0;
   storing the number of the ports that has an ingress-rate equal to 0, represented by Q;
   repeating the previous three steps until ((G−sum of all ingress-rates)/Q) is less than or equal to X; and
   determining that the greedy ports are those having ingress-rates equal to 0.

28. The method of rate-control in claim 27, wherein the algorithm is implemented by a pseudo code with following forms:

```
1)  Q = 1;
2)  temp = ΣRi;
3)  temp = temp − max(Ri);
4)  j = index(max(Ri));
5)  Rj = 0;
6)  X = max(Ri);
7)  loop until ((G − temp)/Q > X) {
8)      j = index(max(Ri));
9)      Rj = 0;
10)     temp = temp − X;
11)     Q++;
12)     X = max(Ri); }.
```

29. The method of rate-control in claim 27, wherein the X is computed as (G−sum of all non-greedy ingress-rates)/Q.

30. The method of rate-control in claim 1, wherein the worst-case capacity required to support communications among ports of the aggregation-group is (G+nB), in the absence of delay, wherein B is an amount of rate increase per time interval t of duration T.

31. The method of rate-control in claim 1, wherein the worst-case capacity required to support communications among ports of the aggregation-group is ((G+nB)+(n−1)BD/T) in the presence of delay D, wherein B is an amount of rate increase per time interval t of duration T.

32. The method of rate-control in claim 1, wherein an additional capacity Mlow or Mhigh is provided.

33. The method of rate-control in claim 32, wherein the guaranteed-rate G is changed to (G+Mlow).

34. The method of rate-control in claim 32, wherein the worst-case capacity required to support communications among ports of the aggregation-group is (G+Mlow+nB+(n−1)BD/T+Mhigh), in the presence of delay D, wherein B is an amount of rate increase per time interval t of duration T.

35. A system for rate-control of aggregate-rate communication services, comprising:
at least one aggregation-group, comprising n ports sharing a guaranteed-rate G;
wherein each port in the aggregation-group obtains ingress-rate information of all other ports in the aggregation-group; ramps allowed-rate of at least two ports in the aggregation group if a sum of the ingress-rate of all ports in the aggregation-group, S, is less than the guaranteed-rate G; and adjusts allowed-rate of at least two ports in the aggregation group so that the sum of allowed-rates of all ports in the aggregation-group for the next time interval is equal to G, if the sum of the ingress-rate of all ports in the aggregation-group, S, is greater than or equal to the guaranteed-rate G, and
wherein each port in the aggregation-group adjusts allowed-rate using a method comprising the steps of, for a local port in the aggregation-group:
determining a maximum allowed-rate X, such that X satisfies G=ΣRi (for Ri<X)+ΣX (for Ri≧X), or G≈ΣRi (for Ri<X)+ΣX (for Ri≧X), where Ri is the ingress-rate of port i (i=1, . . . n) in the aggregation-group, obtained in a rate-message distributed by port i; and
assigning the allowed-rate of the local port a value of MIN(Ilocal, X)+B, wherein B is an amount of rate increase per time interval t of duration T, and Ilocal is the ingress-rate of the local port for the current time interval.

36. The system in claim 35, wherein ports of the aggregation-group share the guaranteed-rate of the aggregation-group fairly.

37. The system in claim 35, further comprising a provider network having an arbitrary topology.

38. The system in claim 35, wherein each port in the aggregation-group further distributes a rate-message containing ingress-rate information of the distributing port.

39. The system in claim 38, wherein each port in the aggregation-group distributes the rate-message by broadcasting.

40. The system in claim 38, wherein each port in the aggregation-group distributes the rate-message by multicasting.

41. The system in claim 38, wherein each port in the aggregation-group distributes the rate-message by unicasting.

42. The system in claim 38, wherein the rate-message comprises an ingress-rate value and identity of the distributing port.

43. The system in claim 38, wherein the rate-message is distributed at a given time interval.

44. The system in claim 35, wherein each port in the aggregation-group ramps allowed-rate by adding an amount B to its current ingress-rate, so that the sum of allowed-rates of all ports in the aggregation-group is equal to the guaranteed-rate G, wherein B is an amount of rate increase per time interval t of duration T.

45. The system of claim 44, wherein B is defined in a Service Level Agreement.

46. The system in claim 44, wherein each port in the aggregation-group further increases the allowed-rate by an amount of (G−(S+nB)/nD) if (s+nB<G), wherein D is the maximum value of delays between any two ports of the aggregation-group.

47. The system in claim 46, wherein the delay between any two ports of the aggregation-group is computed as half the round-trip delay between the two ports.

48. The system in claim 35, wherein each port in the aggregation-group ramps or adjusts allowed-rate at a given time interval.

49. The system of claim 35, wherein B is defined in a Service Level Agreement.

50. The system in claim 35, wherein the step of determining X further comprises:
determining greedy ports; and
computing X such that X is the allowed-rate assigned to each greedy port, allowed-rates of non-greedy ports are unchanged, and the sum of allowed-rates of all ports in the aggregation-group is equal to G.

51. The method of rate control in claim 50, wherein the greedy ports are determined by an algorithm comprising the steps of:
forming an array R using distributed ingress-rates Ri (i=1, . . . n) of port i in the aggregation-group;
sorting array R in a descending order;
stepping through array R from the largest element to the smallest element;
replacing all elements having ingress-rate values larger than the current element with the ingress-rate value of the current element;
repeating the previous two steps until sum of all elements in array R is less than or equal to the guaranteed-rate G; and
determining that the greedy ports are those having an index less than the index of the current element in array R.

52. The system in claim 50, wherein the greedy ports are determined by an algorithm comprising the steps of:
forming an array R using distributed ingress-rates Ri (i=1, . . . n) of port i in the aggregation-group;
sorting array R in a descending order;
stepping through array R from the largest element to the smallest element;

summing up all elements in array R that has an index larger than the index of the current element, resulting in sumAtOrAboveI;

repeating the previous two steps until (sumAtOrAboveI+ k*current element) is less than or equal to the guaranteed-rate G, wherein k is the number of elements that has an index less than or equal to the index of the current element; and determining that the greedy ports are those ports having an index less than or equal to the index of the current element.

53. The system in claim 50, wherein the greedy ports are determined by an algorithm comprising the steps of:

dividing space of possible values of X into two equal partitions;

determining which partition a desired value for X lies in;

repeating the previous two steps until $\Sigma Ri$ (for $Ri<X$)+$\Sigma X$ (for $Ri \geq X$) is approximately equal to the guaranteed-rate G; and determining that the greedy ports are those that having an ingress-rate larger than or equal to X.

54. The system in claim 50, wherein the greedy ports are determined by an algorithm comprising the steps of:

determining the maximum value of the ingress-rates for ports in the aggregation-group;

assigning the maximum value to X;

replacing the ingress-rate of the port that has maximum value with 0;

storing the number of the ports that has an ingress-rate equal to 0, represented by Q;

repeating the previous three steps until ((G−sum of all ingress-rates)/Q) is less than or equal to X; and determining that the greedy ports are those having ingress-rates equal to 0.

55. The system in claim 35, wherein the worst-case capacity required to support communications among ports of the aggregation-group is (G+nB) in the absence of delay, wherein B is an amount of rate increase per time interval t of duration T.

56. The system in claim 35, wherein the worst-case capacity required to support communications among ports of the aggregation-group is (G+nB+(n−1)BD/T) in the presence of delay D, wherein B is an amount of rate increase per time interval t of duration T.

57. The system in claim 35, wherein an additional capacity Mlow or Mhigh is provided.

58. The system in claim 57, wherein the guaranteed-rate G is changed to (G+Mlow).

59. The system in claim 57, wherein the worst-case capacity required to support communications among ports of the aggregation-group is (G+Mlow+nB+(n−1)BD/T+Mhigh) in the presence of delay D, wherein B is an amount of rate increase per time interval t of duration T.

60. A method of rate-control for an aggregation-group in a communication network, wherein the aggregation-group comprises n ports sharing a guaranteed-rate G fairly, comprising the steps of, for each local port:

obtaining ingress-rate information of all other ports in the aggregation-group;

allowing, by a processor, controlled growth of allowed-rate of the local port by setting the allowed-rate for the next time interval to (Ilocal+B), if a sum of the ingress-rate of all ports in the aggregation-group, S, is less than the guaranteed-rate G; and adjusting, by a processor, allowed-rate of the local port such that the allowed-rate is equal to (MIN(Ilocal,X)+ B), if the sum of the ingress-rate of the aggregation-group, S, is greater than or equal to the guaranteed-rate G, wherein X satisfies G=$\Sigma Ri$ (for $Ri<X$)+$\Sigma X$ (for $Ri \geq X$), or G$\approx$$\Sigma Ri$ (for $Ri<X$)+$\Sigma X$ (for $Ri \geq X$);

wherein B is an amount of rate increase per time interval of duration T; Ri is the ingress-rate of port i (i=1, . . . n) in the aggregation-group, obtained in a rate-message distributed by port i; and Ilocal is the ingress-rate of the local port for the current time interval;

wherein the communication network has an arbitrary topology.

* * * * *